(12) United States Patent
Jin et al.

(10) Patent No.: US 12,299,197 B2
(45) Date of Patent: May 13, 2025

(54) TOUCH DEVICE

(71) Applicant: Peratech IP Ltd., North Yorkshire (GB)

(72) Inventors: Cao Jin, Jiansu (CN); Xu Feng, Jiansu (CN); Wei Xin, Jiansu (CN); Lv Bing, Jiansu (CN)

(73) Assignee: Peratech IP Ltd, North Yorkshire (GB)

( * ) Notice: Subject to any disclaimer, the term of this patent is extended or adjusted under 35 U.S.C. 154(b) by 0 days.

(21) Appl. No.: 18/011,241

(22) PCT Filed: Jun. 17, 2021

(86) PCT No.: PCT/GB2021/000073
§ 371 (c)(1),
(2) Date: Dec. 19, 2022

(87) PCT Pub. No.: WO2021/255407
PCT Pub. Date: Dec. 23, 2021

(65) Prior Publication Data
US 2023/0341939 A1 Oct. 26, 2023

(30) Foreign Application Priority Data
Jun. 17, 2020 (CN) .......................... 202021129383.X (51) Int. Cl.
*G06F 3/01* (2006.01)
*G06F 3/0354* (2013.01)
*G06F 3/041* (2006.01)

(52) U.S. Cl.
CPC .......... *G06F 3/016* (2013.01); *G06F 3/03547* (2013.01); *G06F 3/0414* (2013.01); *G06F 2203/04105* (2013.01)

(58) Field of Classification Search
CPC .... G06F 3/016; G06F 3/03547; G06F 3/0414; G06F 2203/04105; G06F 2203/04103; G06F 3/04142
See application file for complete search history.

(56) References Cited

U.S. PATENT DOCUMENTS

| | | |
|---|---|---|
| 2014/0354568 A1 | 12/2014 | Andrews et al. |
| 2016/0259480 A1* | 9/2016 | Augenbergs .......... G01L 5/0028 |
| 2017/0292887 A1* | 10/2017 | Schmidt ................. G01L 1/142 |
| 2019/0025922 A1* | 1/2019 | Lu .......................... G06F 1/1626 |

OTHER PUBLICATIONS

International Search Report and Written Opinion cited in PCT/GB2021/000073, dated Sep. 28, 2021, 10 pages.

* cited by examiner

*Primary Examiner* — Cao H Nguyen
(74) *Attorney, Agent, or Firm* — Cooper Legal Group LLC (57) ABSTRACT

A touch device comprises a base, a membrane pressure sensor arranged on the base, a touch sensing layer covering the membrane pressure sensor, and a force feedback structure arranged on the lower surface of the touch sensing layer and electrically connected to the membrane pressure sensor. The membrane pressure sensor is configured to generate a pressing signal related to the force applied to it, and the force feedback structure is configured to receive the pressing signal and generate a feedback force corresponding to it.

12 Claims, 9 Drawing Sheets

TOUCH DEVICE

CROSS REFERENCE TO RELATED APPLICATIONS

This application claims priority from Chinese Utility Model number 202021129383.X, filed on 17 Jun. 2020, the whole contents of which are incorporated herein by reference.

BACKGROUND OF THE INVENTION

The present invention relates to a touch device and a method of supplying feedback to a user of a touch device.

In existing touch devices, there is no mechanism for a user to receive feedback related to the pressure they are applying to the device, so that there is no in-depth interaction between the user and the touch device, resulting in a poor user experience.

BRIEF SUMMARY OF THE INVENTION

According to a first aspect of the present invention, there is provided a touch device, comprising: a base, a membrane pressure sensor arranged on the base, configured to generate a pressure signal related to the force applied to it, a touch sensing layer with its lower surface covering the membrane pressure sensor, and a force feedback structure arranged on the lower surface of the touch sensing layer and electrically connected to the membrane pressure sensor, configured to receive the pressure signal and generate a feedback force corresponding to the pressure signal; wherein: the membrane pressure sensor comprises an upper membrane, a lower membrane, a support structure, and a pressure sensing element; the upper membrane and the lower membrane are connected by the support structure to form a cavity; and the pressure sensing element is arranged in the cavity and comprises: an upper electrode disposed on the lower surface of the upper membrane, a lower electrode disposed on the upper surface of the lower membrane, and a variable resistance elastic body disposed on the lower electrode.

In this touch device, the membrane pressure sensor generates a relevant pressure signal according to the pressing force of the received finger, and then transmits it to the force feedback structure. The force feedback structure generates a feedback force corresponding to the pressing force according to the received pressing signal. In turn, the feedback force is transmitted to the user's finger through the touch sensing layer. When the pressing force changes, the pressure signal and the feedback force also change accordingly, thereby realizing the pressure feedback of the touch device and solving problems with existing touch devices. In previous devices, the user cannot receive the pressure feedback of the touch device when pressing and touching, so that there is no deep interaction between the user and the touch device which causes the problem of poor user experience. The claimed invention creates an in-depth human-computer interaction, and improves the user experience. In addition, the structure is simple and cost-saving.

According to a second aspect of the present invention, there is provided a method of supplying feedback to a user of a touch device, comprising the steps of: obtaining a touch device comprising a base, a membrane pressure sensor, a force feedback structure and a touch sensing layer; at the membrane pressure sensor, detecting a force applied by a user to the touch sensing layer, generating a pressure signal, and providing the pressure signal to the force feedback structure; and at the force feedback structure, generating force feedback corresponding to the pressure signal and transmitting it to the user via the touch sensing layer; wherein: the membrane pressure sensor comprises an upper membrane, a lower membrane, a support structure, and a pressure sensing element; the upper membrane and the lower membrane are connected by the support structure to form a cavity; and the pressure sensing element is arranged in the cavity and comprises: an upper electrode disposed on the lower surface of the upper membrane, a lower electrode disposed on the upper surface of the lower membrane, and a variable resistance elastic body disposed on the lower electrode.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
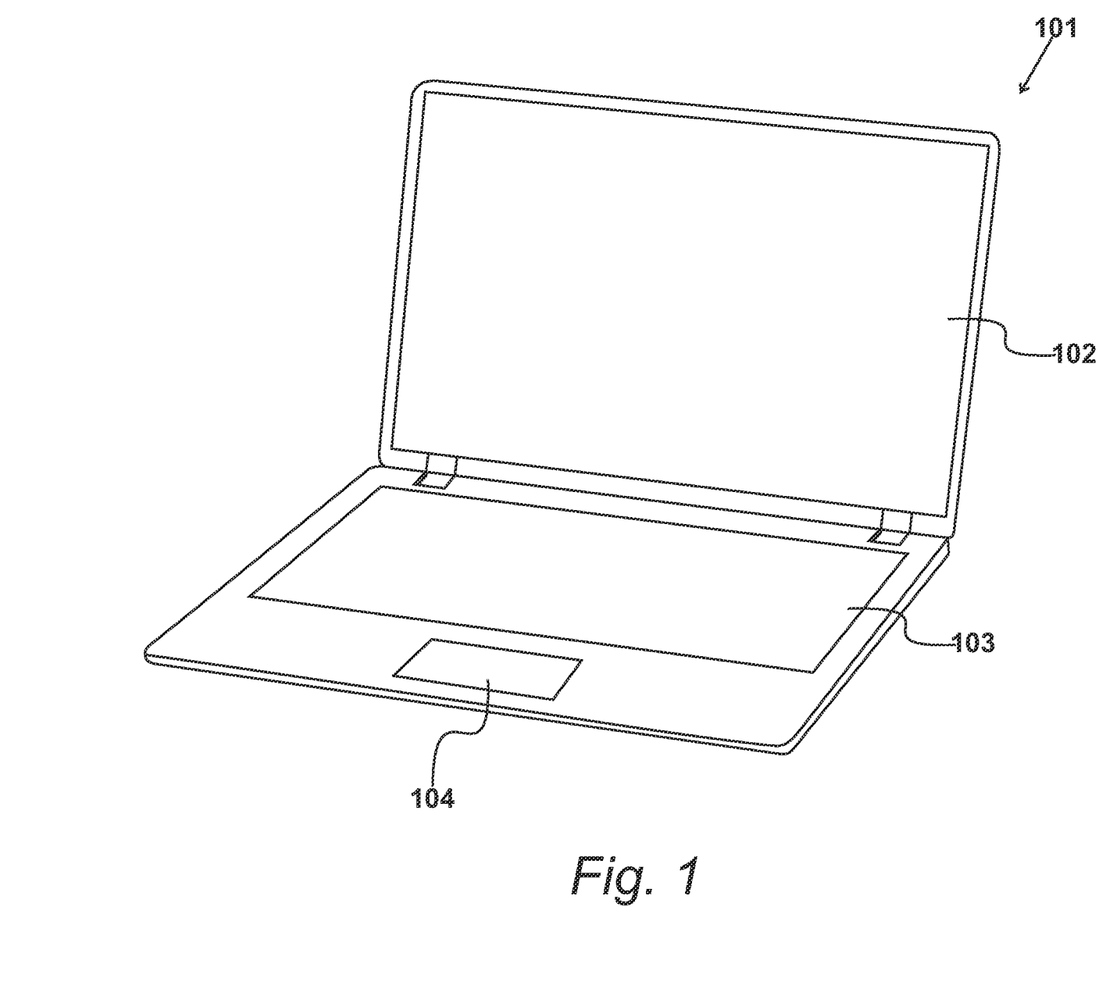
FIG. 1 illustrates an environment in which the invention may be deployed.

FIG. 1

FIG. 1 illustrates an environment in which the invention described herein may be deployed. A computer 101 is of the laptop type, and includes a display screen 102, a keyboard 103 and a trackpad 104. Trackpad 104, as is known in the art, has one or more areas that functions as a button for user input.

The invention described herein may be used for any type of touch device where user feedback may be useful.

Figure 2:
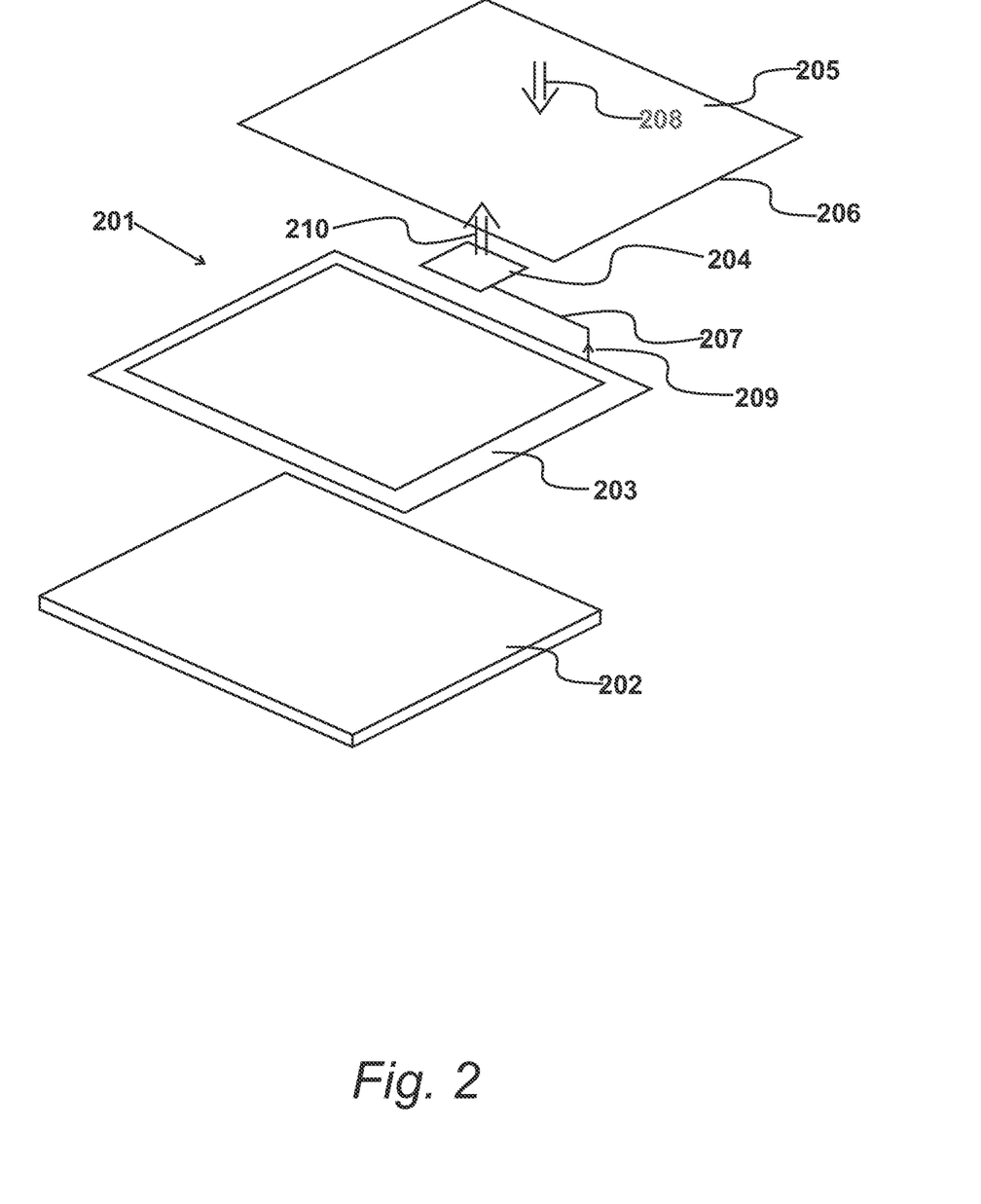
FIG. 2 is an exploded structural diagram of a touch device that can be used in the environment shown in FIG. 1.

FIG. 2

FIG. 2 is an exploded structural diagram of a touch device suitable for use as part or whole of trackpad 104.

The touch device 201 includes a base 202, a membrane pressure sensor 203, a force feedback structure 204, and a touch sensing layer 205. Membrane pressure sensor 203 is disposed on the base 202. Force feedback structure 204 is disposed on the lower surface 206 of touch sensing layer 205, and touch sensing layer 205 covers membrane pressure sensor 203. Membrane pressure sensor 203 is electrically connected to force feedback structure 204, as shown diagrammatically by connection 207.

In use, a user's finger presses touch sensing layer 205, which receives the pressing force of the finger, shown by arrow 208, and transmits the pressing force 208 to membrane pressure sensor 203 below. In response to pressing force 208, sensor 203 generates a pressure signal, shown diagrammatically by arrow 209. Signal 209 is transmitted to force feedback structure 204 via its electrical connection 207 to membrane pressure sensor 203. Force feedback structure 204 generates a feedback force, shown by arrow 210, corresponding to pressing force 208 according to pressure signal 209. Feedback force 210 is fed back, and the feedback force is transmitted to the touch sensing layer 205, and the touch sensing layer 205 transmits the feedback force to the user's finger, so that the user can feel the force fed back by the touch device.

Wherein, when the pressing force 208 applied by the user's finger changes, the pressure signal 209 generated by membrane pressure sensor 203 also changes. When pressure signal 209 changes, the feedback force 210 generated by force feedback structure 204 also changes.

In the above-designed touch device, membrane pressure sensor 203 generates a relevant pressing signal 209 according to the pressing force 208 of the finger and then transmits it to force feedback structure 204. Force feedback structure 204 generates a feedback function 208 corresponding to the pressing force according to the received pressure signal 209. The feedback force is transmitted to the user's finger through touch sensing layer 205. At the same time, when the pressing force changes, the pressure signal and the feedback force also change accordingly, thereby implementing the pressure feedback of the touch device. This solves the problem that in standard touch devices, a user cannot receive pressure feedback from the touch device when pressing and touching, so that there is no in-depth interaction between the user and the touch device.

In this and other embodiments, the force feedback structure 804 may include a chip (not shown) and a micro-vibration motor (not shown), and the chip can receive changes transmitted by membrane pressure sensor 203. The pressing signal generates a changing control signal according to the changing pressing signal, and controls the micro vibrating motor to vibrate to varying degrees according to the changed control signal to generate a changing feedback force and transmit it to touch sensing layer 205 and then to the user's finger.

Figure 3:
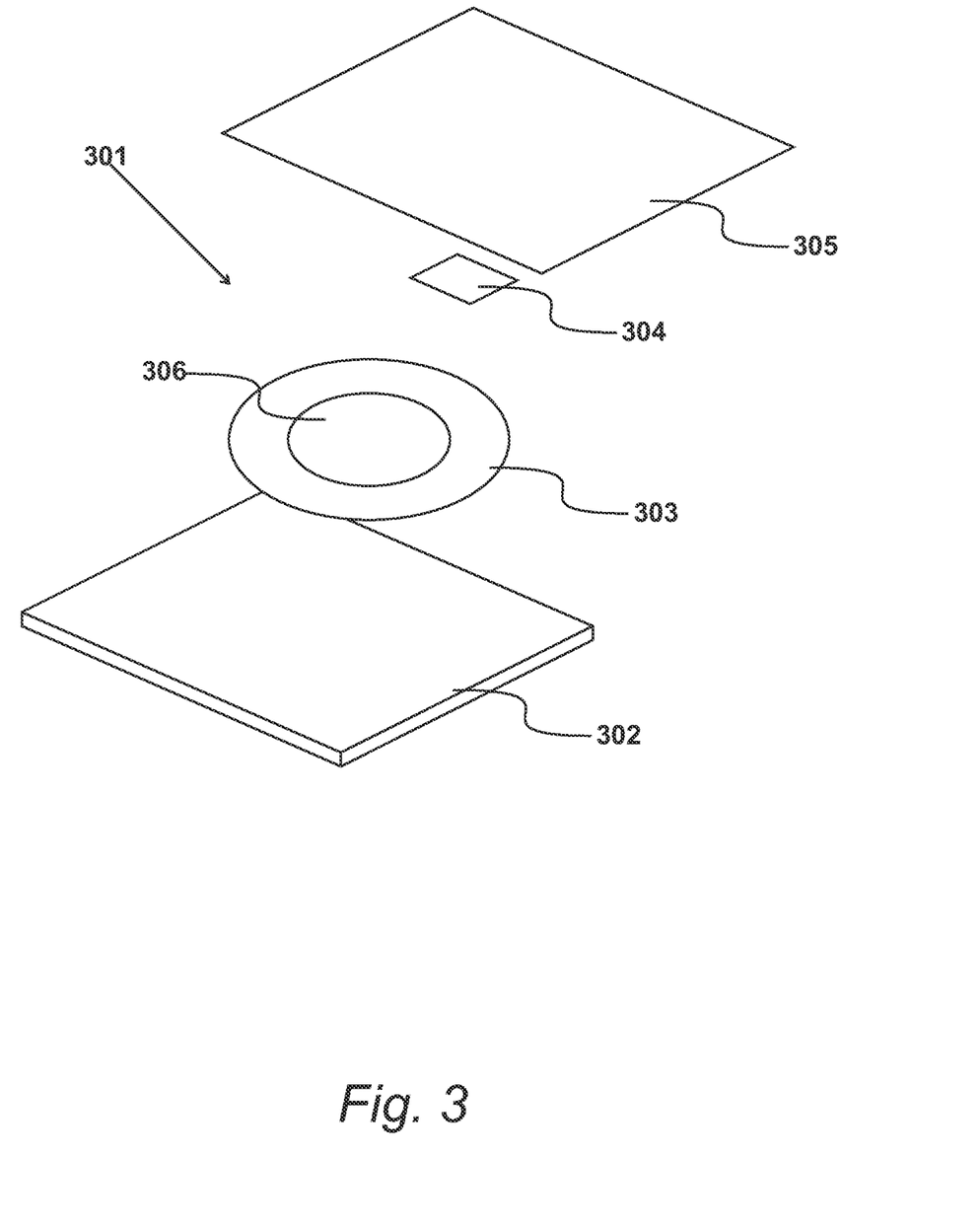
FIG. 3 is an exploded structural illustration of a second embodiment of a touch device.

FIG. 3

FIG. 3 is an exploded structural illustration of a second embodiment of the invention. Touch device 301 has a base 302, a force feedback structure 304, and a touch sensing layer 305, all similar to those of touch device 201. However, membrane pressure sensor 303 is a ring shape defining a recess 306 within itself on base 302. Force feedback structure 304, disposed on the lower surface of touch sensing layer 305, is within recess 306, and may be in contact with base 302, and may not be in contact with base 302, or be in a suspended state, so as not to prevent the user from touching the touch sensing layer 305. Otherwise, when pressure is applied, force feedback structure 304 will generate a force against base 302, meaning that membrane pressure sensor 303 is not receiving the force.

A membrane pressure sensor included in a touch device of this embodiment may have any shape of ring, including a rectangular ring as shown in FIG. 1. Using a ring rather than a solid plane saves material and cost without altering the sensing effect; further, the weight of the touch device is reduced, making the touch device more portable. Additionally, the force feedback structure is within the ring-shaped membrane pressure sensor, making the structure of the touch device more compact, which saves resources and costs.

Figure 4:
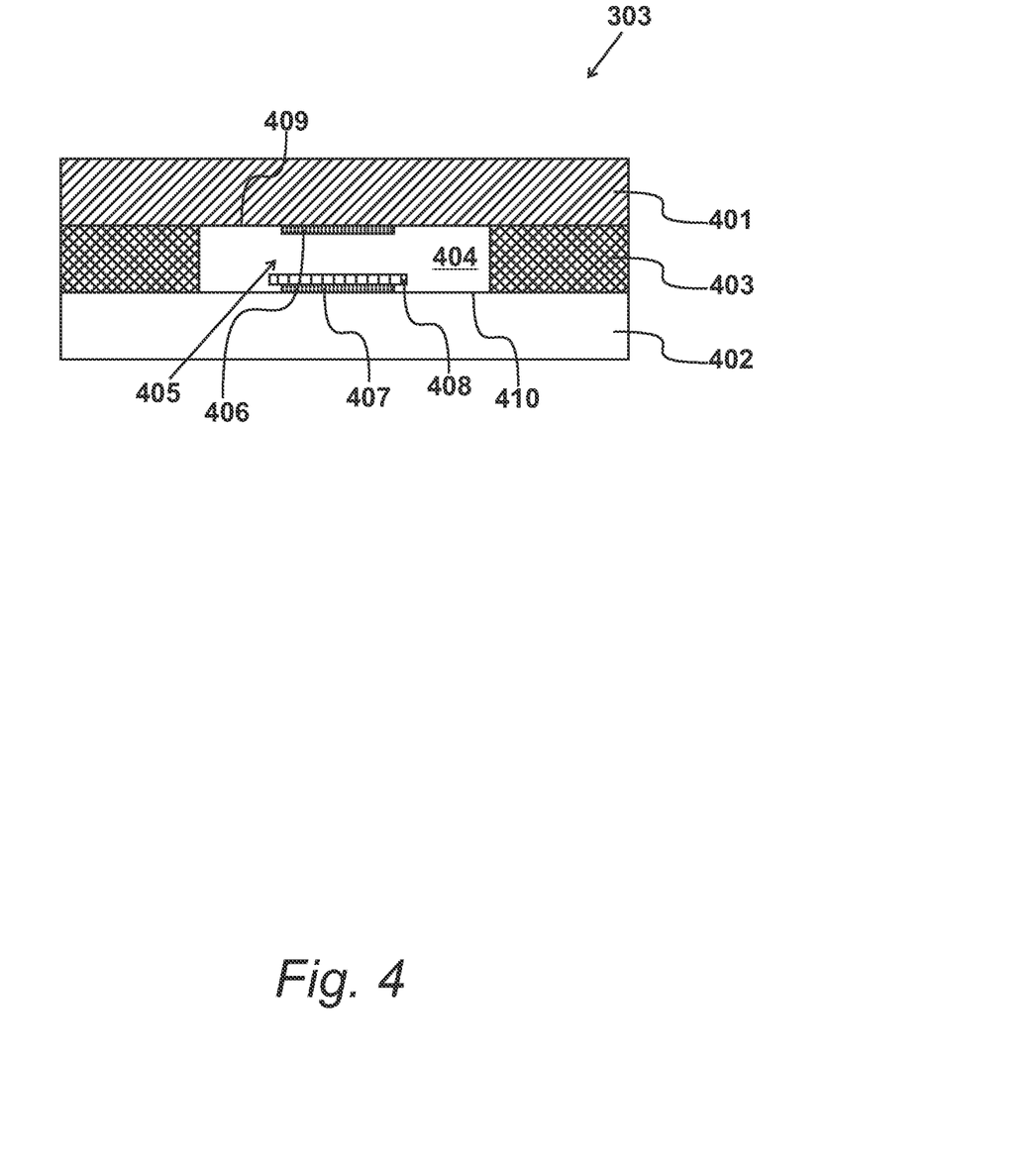
FIG. 4 is a cross section of a membrane pressure sensor shown in FIG. 3.

FIG. 4

FIG. 4 is a cross section of membrane pressure sensor 303. This arrangement could also be used in another embodiment of the touch device. Sensor 303 includes an upper membrane 401, a lower membrane 402, and a support structure 403. Upper membrane 401 and lower membrane 402 are connected by support structure 403 to form a cavity 404, within which a pressure sensing element 405 is arranged. Pressure sensing element 405 includes an upper electrode 406, a lower electrode 407 and an elastic body 408. Upper electrode 406 is disposed on the lower surface 409 of upper membrane 401, while lower electrode 407 is disposed on the upper surface 410 of lower membrane 402. Elastic body 408 is disposed on lower electrode 407. Elastic body 407 is made from a quantum tunnelling composite, such as that supplied by the applicant under the registered trade mark QTC®, although it may be made from another variable resistance elastomer such as graphene. The elastomeric material is an insulator when it is not under pressure, and becomes a conductor under pressure, and its resistance will change with the increase of pressure. Therefore, when upper membrane 401 is deformed towards lower membrane 401, elastic body 409 will be compressed between upper electrode 406 and lower electrode 407, thus generating a pressing signal related to the change in the pressure force.

Figure 5A:
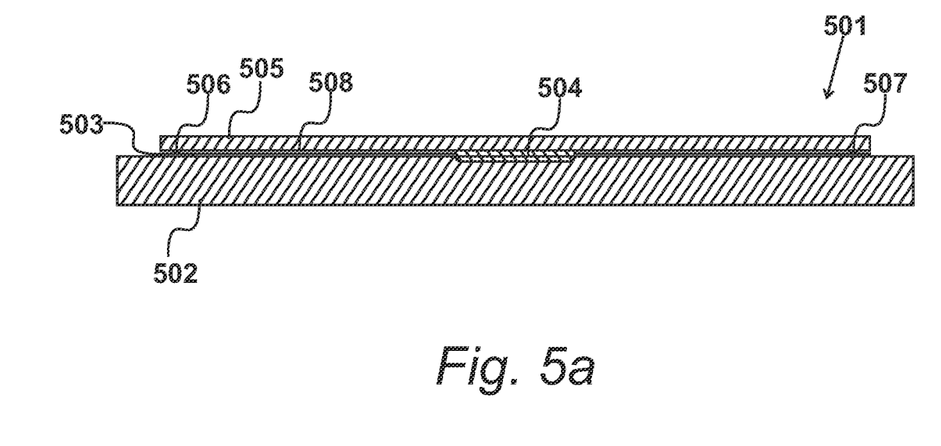
FIG. 5*a* is a cross sectional structural diagram of a third embodiment of the invention.
Figure 5B:
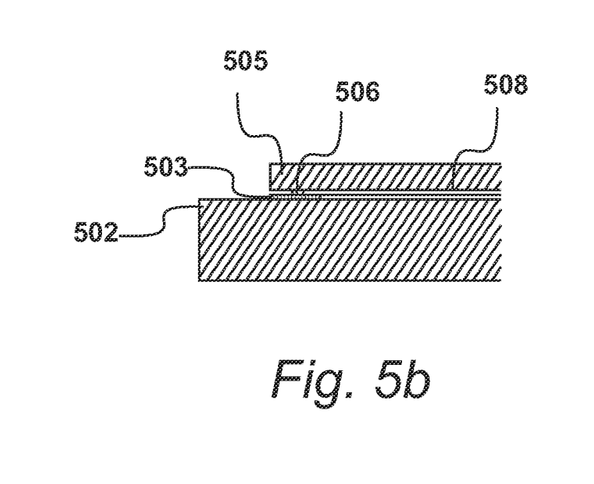
FIG. 5*b* shows part of FIG. 5*a* in more detail.

FIGS. 5a and 5b

FIG. 5a is a cross section of a third embodiment of the invention, with FIG. 5b being a close-up of the left-hand area. Touch device 501 has a base 502, a membrane pressure sensor 503, a force feedback structure 504 and a touch sensing layer 505, all similar to those of touch device 201. In order to concentrate the force of a user's finger on membrane pressure sensor 503, the lower surface 508 of touch sensing layer 505 is provided with at least one protrusion abutting membrane pressure sensor 503. Protrusions 506 and 507 are shown in these Figures.

When a user touches the touch sensing layer 505 with a finger, at least one protrusion 601 on the lower surface 508 of layer 505 will exert force on the abutting membrane pressure sensor 503 when touch sensing layer 505 is pressed, thereby achieving a concentrated pressing effect.

If the sensor used is of the type described with reference to FIG. 4, a protrusion may be above the cavity 404 to ensure contact between electrodes 406 and 407 via elastic body 408.

Figure 6:
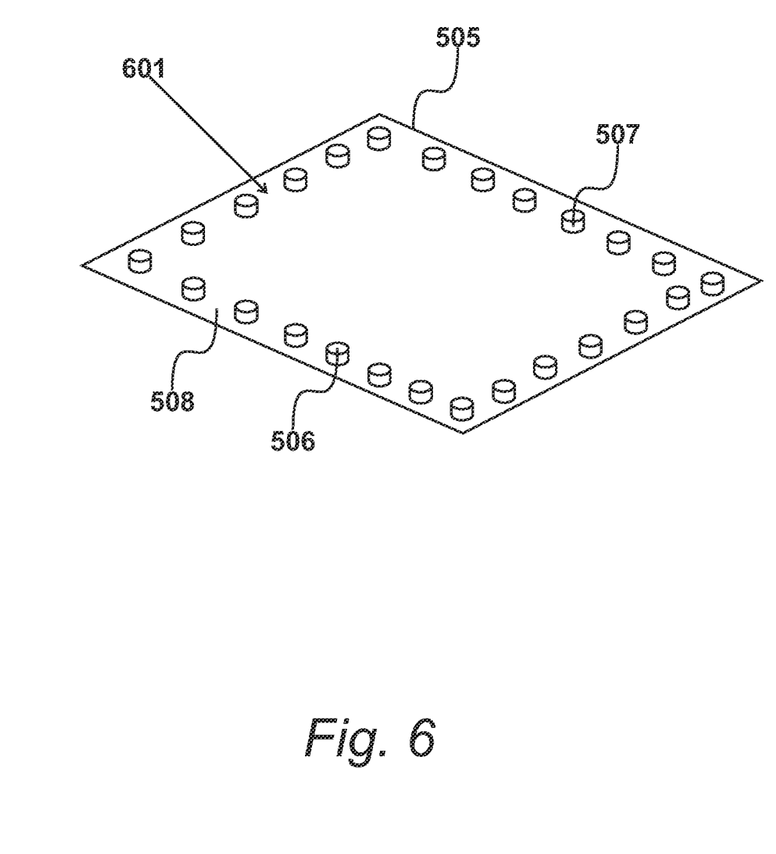
FIG. 6 illustrates the lower surface of a touch sensor layer shown in FIG. 5*a*.

FIG. 6

FIG. 6 illustrates the lower surface 508 of touch sensor layer 505, showing a plurality of protrusions 601 such as protrusions 506 and 507. In this case, membrane pressure sensor 503 is a rectangular ring shape, and so protrusions 601 are arranged in a similar shape. If the sensor were a circular ring, the protrusions would be arranged in a similar circle, and so on. The protrusions are evenly spaced and distributed, and each is opposite and abuts the membrane pressure sensor. In a still further embodiment, there could be only one protrusion or any number of them.

Protrusions 601 are of a cylindrical shape and are integrally formed with touch sensing layer 505; alternatively they may be another shape such as cuboid, and may be attached to layer 505 by an adhesive layer or similar. Touch sensing layer 505 and protrusions 601 can be made of high-hardness materials such as metal, glass, and hard plastic.

Figure 7:
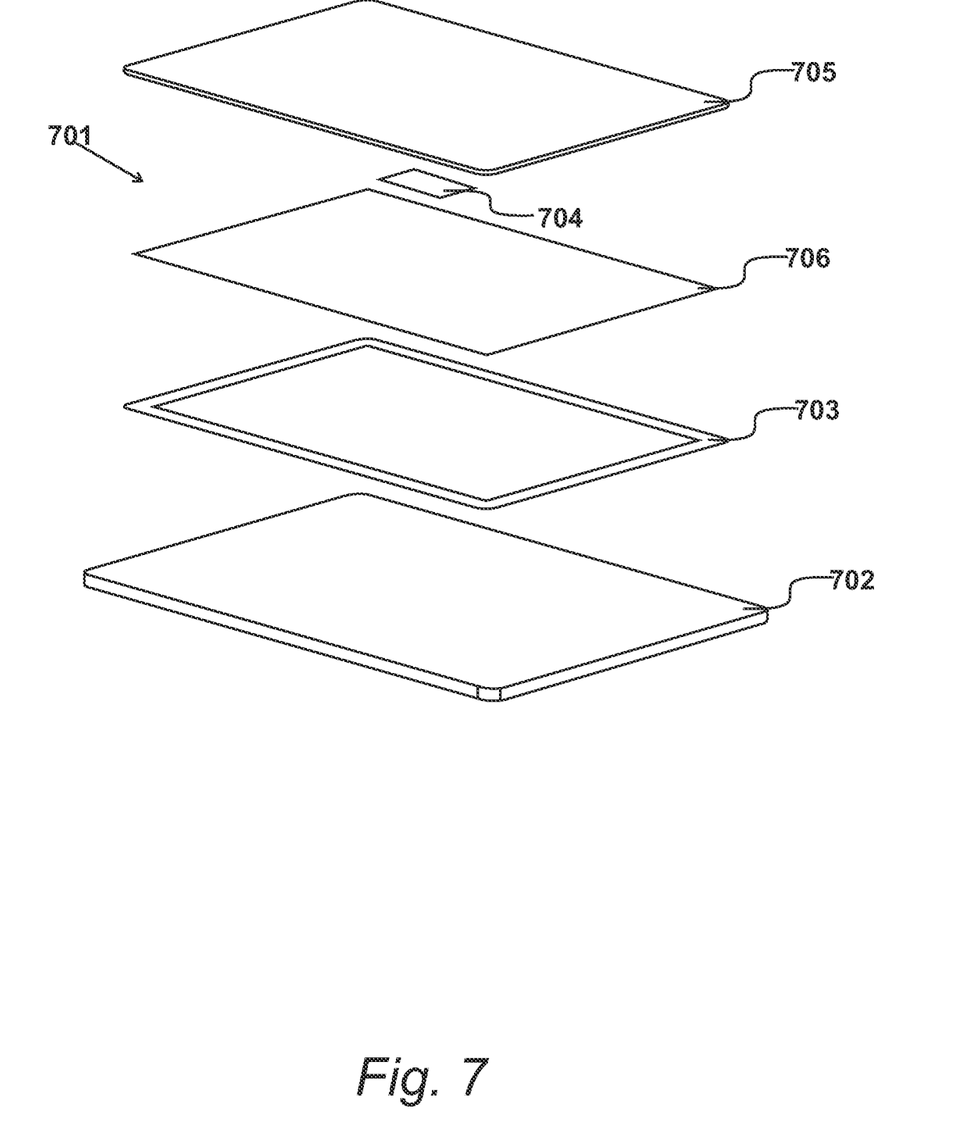
FIG. 7 is an exploded structural illustration of a fourth embodiment of the invention.

FIG. 7

FIG. 7 is an exploded structural illustration of a fourth embodiment of the invention. Touch device 701 has a base 702, a membrane pressure sensor 703, a force feedback structure 704 and a touch sensing layer 705, all similar to those of touch device 201. In addition, there is an elastic structure layer 706 above the membrane pressure sensor 703.

In order to allow the force of the finger on touch sensing layer 705 to be more concentratedly applied to membrane pressure sensor 703, in addition to or instead of the aforementioned protrusions on the lower surface of touch sensing layer 705, elastic structure layer 706 is provided. The shape of elastic structure layer 706 corresponds to the shape of membrane pressure sensor 703. When the shape of membrane pressure sensor 703 is a rectangular ring shape, as in touch device 701, elastic structure layer 706 is also a rectangular ring; when the shape of the membrane pressure sensor is a circular ring, the shape of the elastic structure layer is also a circular ring, and so on. Touch sensing layer 705 presses on membrane pressure sensor 703 through elastic structure layer 706.

Elastic structure layer 706 can be directly opposite to the vacant space of membrane pressure sensor 703, so as to more easily and completely transmit the pressing force received to membrane pressure sensor 703.

The material of elastic structure layer 706 can be a soft material such as foam glue, which can also provide waterproofing and dustproofing. The upper and lower surface of elastic structure layer 706 are each provided with a glue layer. The adhesive layer on the upper surface is connected with touch sensing layer 705, and the adhesive layer of the lower surface abuts against membrane pressure sensor 703.

Figure 8:
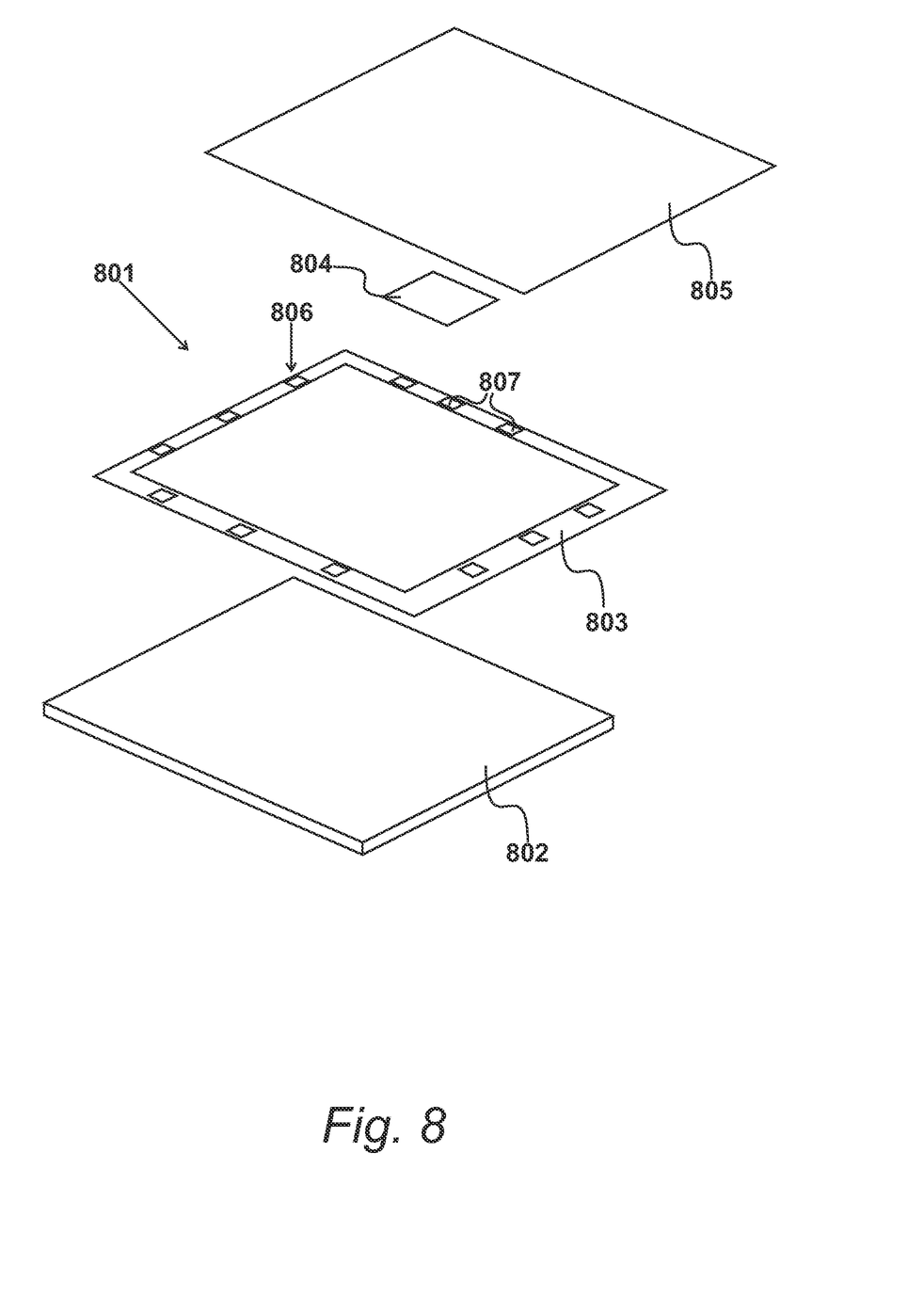
FIG. 8 is an exploded structural illustration of a fourth embodiment of the invention.

FIG. 8

FIG. 8 is an exploded structural illustration of a fourth embodiment of the invention. Touch device 801 has a base 802, a membrane pressure sensor 803, a force feedback structure 804 and a touch sensing layer 805, all similar to those of touch device 701. In addition, an elastic structure layer 806 is implemented by a plurality of discrete elastic blocks 807. Elastic blocks 807 are spaced apart, disposed between membrane pressure sensor 803 and touch sensing layer 805. In this embodiment, membrane pressure sensor 803 is a ring and elastic blocks 807 are arranged around the ring.

The plurality of discrete elastic blocks may all be opposed to the vacant space of the membrane pressure sensor so as to more easily and completely transmit the pressing force received to the membrane pressure sensor.

Figure 9A:
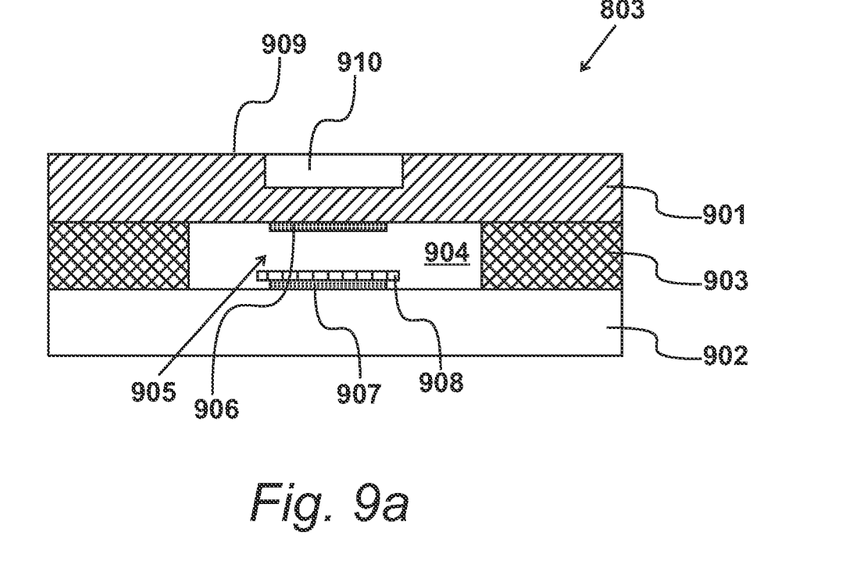
FIG. 9*a* is a cross section of a membrane pressure sensor shown in FIG. 8.
Figure 9B:
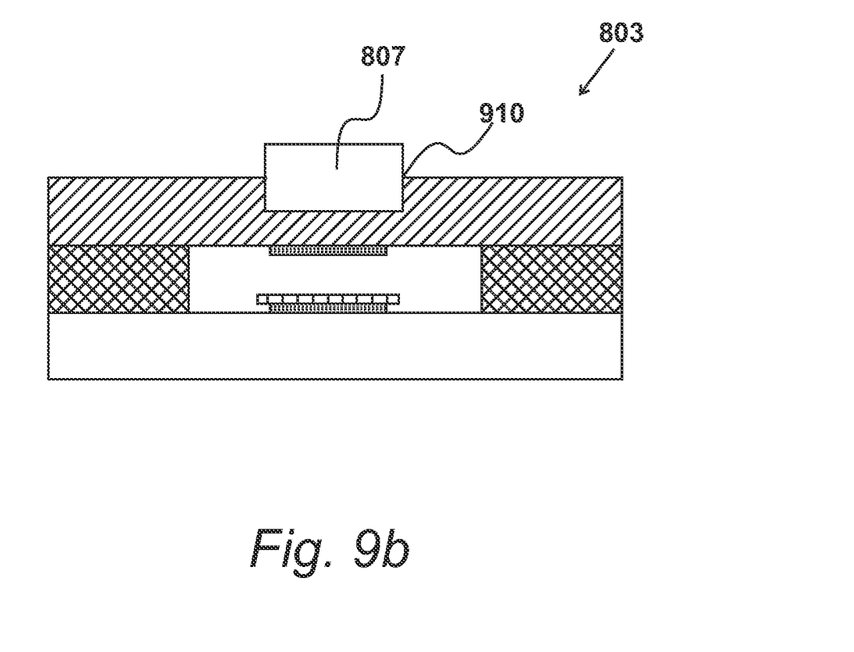
FIG. 9*b* is a cross section of the same membrane pressure sensor shown in FIG. 8.

FIGS. 9a and 9b

FIGS. 9a and 9b are a cross section of membrane pressure sensor 803 and an elastic block 807. This arrangement may also be used in other embodiments that have an elastic structure layer.

As shown in FIG. 9a, and similarly to the membrane pressure sensor of FIG. 4, sensor 803 has an upper membrane 901, a lower membrane 902, and a support structure 903. Upper membrane 901 and lower membrane 902 are connected by support structure 903 to form a cavity 904, within which a pressure sensing element 905 is arranged. Pressure sensing element 905 includes an upper electrode 906, a lower electrode 907 and an elastic body 908 disposed on lower electrode 907.

The upper surface 909 of the upper membrane 901 defines a depression 910. Depression 910 is opposite to cavity 904.

As shown in FIG. 9b, elastic block 807 is at least partially within depression 910. Elastic block 807 is connected with membrane pressure sensor 803 in the depression 910 by means of elastic deformation.

Membrane pressure sensor 803 may define further depressions for further elastic blocks. Alternatively, if a single elastic structure is used, a single depression may be defined.

The bottom surface of touch sensing layer 805 can also define a depression, and elastic block 807 can also be connected to the touch sensing layer in this depression, through elastic deformation.

In this description, it should be noted that the orientation or positional relationship indicated by the terms "within", "above", "below" and similar is based on the orientation or positional relationship shown in the drawings, or the way the product is usually placed when used. The orientation or positional relationship is only for the convenience of describing the application and simplifying the description, rather than indicating or implying that the device or element referred to must have a specific orientation or be constructed and operated in a specific orientation, and therefore cannot be construed as a limitation of the application.

It should also be noted that, unless otherwise clearly specified and limited, the terms "disposed", "arranged" and "connected" should be understood in a broad sense, for example, it can be a fixed connection, a detachable connection, or an integral connection; it can be a direct connection. The connection can also be indirectly connected through an intermediate medium, and it can be the internal communication between two components.

The invention claimed is:

1. A touch device, comprising:
   a base;
   a pressure sensor arranged on the base and configured to generate a pressure signal related to a force applied to the pressure sensor;
   a touch sensing layer having a bottom surface covering the pressure sensor; and
   a force feedback structure arranged on the bottom surface of the touch sensing layer and electrically connected to the pressure sensor, the force feedback structure configured to receive the pressure signal and generate a feedback force corresponding to the pressure signal;
   wherein:
   the pressure sensor comprises an upper membrane, a lower membrane, a support structure, and a pressure sensing element;

the upper membrane and the lower membrane are connected by the support structure to form a cavity; and the pressure sensing element is arranged in the cavity and comprises:
an upper electrode disposed on a bottom surface of the upper membrane,
a lower electrode disposed on a top surface of the lower membrane, and
a variable resistance elastic body disposed on the lower electrode, in which resistance of the variable resistance elastic body changes with an increase in the applied force, so as to change the pressure signal and change the feedback force corresponding to the pressure signal.

2. A touch device according to claim 1, wherein the pressure sensor has a hoop shape and defines a recess on the base, and the force feedback structure is opposite to the cavity.

3. A touch device according to claim 2, wherein the pressure sensor has a rectangular hoop shape or a circular hoop shape.

4. A touch device according to claim 1, further comprising a protrusion on the bottom surface of the touch sensing layer, wherein the protrusion abuts the pressure sensor.

5. A touch device according to claim 4, comprising a plurality of further protrusions on the bottom surface of the touch sensing layer and all abutting the pressure sensor, wherein the plurality of further protrusions are evenly spaced and distributed on the bottom surface of the touch sensing layer.

6. A touch device according to claim 1, further comprising an elastic structure layer disposed below the touch sensing layer.

7. A touch device according to claim 6, wherein the elastic structure layer is disposed directly above the pressure sensor.

8. A touch device according to claim 6, wherein a glue layer is attached to each of a top surface and a bottom surface of the elastic structure layer.

9. A touch device according to claim 8, wherein the elastic structure layer comprises a plurality of discrete elastic blocks disposed between the pressure sensor and the touch sensing layer.

10. A touch device according to claim 4, wherein the protrusion is opposite to the cavity.

11. A touch device according to claim 6, wherein:
a depression is defined on a top surface of the upper membrane, the depression being opposite to the cavity, and the elastic structure layer is at least partially within the depression.

12. A method of supplying feedback to a user of a touch device, comprising the steps of:
obtaining a touch device comprising a base, a pressure sensor, a force feedback structure and a touch sensing layer;
at the pressure sensor, detecting a force applied by a user to the touch sensing layer, generating a pressure signal, and providing the pressure signal to the force feedback structure; and
at the force feedback structure, generating feedback force corresponding to the pressure signal and transmitting the feedback force to the user via the touch sensing layer;
wherein:
the pressure sensor comprises an upper membrane, a lower membrane, a support structure, and a pressure sensing element;
the upper membrane and the lower membrane are connected by the support structure to form a cavity; and
the pressure sensing element is arranged in the cavity and comprises:
an upper electrode disposed on a bottom surface of the upper membrane,
a lower electrode disposed on a top surface of the lower membrane, and
a variable resistance elastic body disposed on the lower electrode, in which resistance of the variable resistance elastic body changes with an increase in the applied force, so as to change the pressure signal and change the feedback force corresponding to the pressure signal.

* * * * *